United States Patent [19]

Lawandy

[11] Patent Number: 4,803,688
[45] Date of Patent: Feb. 7, 1989

[54] ORDERED COLLOIDAL SUSPENSION OPTICAL DEVICES

[76] Inventor: Nabil M. Lawandy, 52 Humboldt Ave., Providence, R.I. 01906

[21] Appl. No.: 174,001

[22] Filed: Mar. 28, 1988

[51] Int. Cl.$^4$ ................................................ H01S 3/10
[52] U.S. Cl. .................................... 372/21; 350/362; 372/39
[58] Field of Search ...................... 372/21, 39; 350/362

[56] References Cited

U.S. PATENT DOCUMENTS

| | | |
|---|---|---|
| 3,868,589 | 2/1975 | Wang . |
| 4,501,470 | 2/1985 | Yeh . |
| 4,548,479 | 10/1985 | Yeh . |
| 4,627,689 | 12/1986 | Asher ................................ 350/362 |
| 4,632,517 | 12/1986 | Asher ................................ 350/362 |
| 4,675,876 | 6/1987 | Svilans . |

OTHER PUBLICATIONS

W. S. Rabinovich & N. M. Lawandy "Distributed Feedback Modes in a Partially Filled Ring Cavity", IEEE Journal of Quantum Electronics, vol. AE-23, No. 2, Feb. 1987.
H. Kogelnik & C. V. Shank "Coupled Wave Theory of Distributed Feedback Lasers", J. Appl. Phys., vol. 43, No. 5, May 1972.
"Solicitation, Offer and Award", issue date Mar. 1, 1988.
"Theoretical Analysis of the Crystalline Array Filter", by Robert J. Spry and David J. Kosan, Applied Spectroscopy, vol. 40, No. 6, 1986.
"Crystalline Colloidal Bragg Diffraction Devices: The Basis for New Generation of Raman Instrumentation", by Sanford A. Asher, Perry L. Flaugh and Guy Washinger, Spectroscopy, vol. 1, No. 12, 1986.
"Development of a New Optical Wavelength Rejection Filter: Demonstration of Its Utility in Raman Spectroscopy", by Perry L. Flaugh, Stephen E. O'Donnell and Sanford A. Asher, Applied Spectroscopy, vol. 38, No. 6, 1984).

Primary Examiner—Leon Scott, Jr.
Attorney, Agent, or Firm—Perman & Green

[57] ABSTRACT

A number of ordered colloidal suspension Bragg reflection optical devices are disclosed each of which comprises a receiver for receiving incident electromagnetic radiation, a modulator, responsive to at least one characteristic of the received radiation, for modulating the received radiation and an emitter for emitting the modulated radiation. The receiver, modulator and the emitter comprise a crystalline colloidal suspension having a lattice structure comprised of a plurality of parallel planes of ordered, electrically charged spheres suspended in an optically active medium, adjacent ones of the planes having a substantially uniform spacing therebetween. The optically active medium comprises molecules selected to have a predetermined index of refraction, radiation absorption, radiation emission or a nonlinear optical response property at a wavelength substantially equal to twice the spacing between the planes. The medium may contain a dye solute, the particular dye being selected to have a radiation absorption and/or emission wavelength which is substantially equal to twice the spacing between the parallel planes.

48 Claims, 6 Drawing Sheets $n = n_0 + n_1 \cos(\beta x)$
$\beta = 2\pi/d \quad d = \lambda/2n_0$

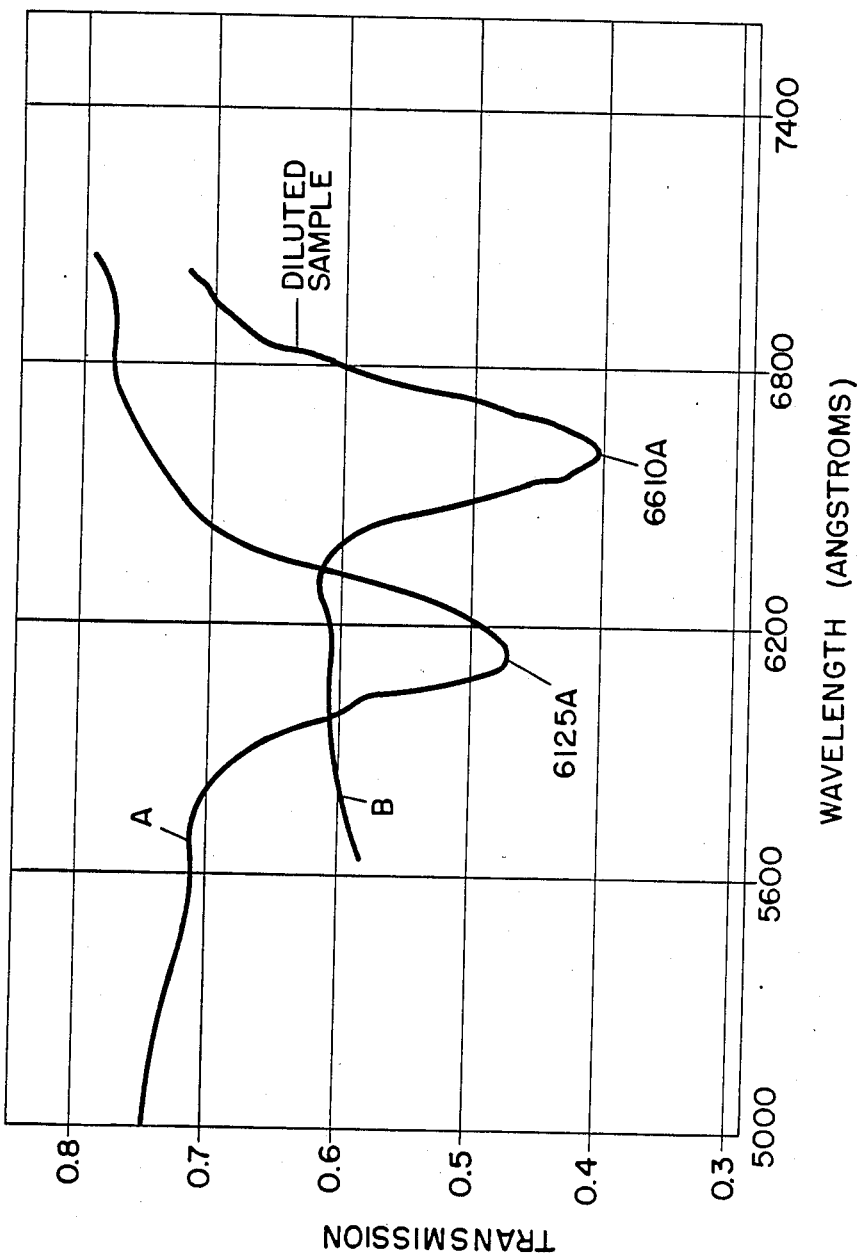

ORDERED COLLOIDAL SUSPENSION OPTICAL DEVICES

FIELD OF THE INVENTION

The present invention relates generally to optical devices and, in particular, relates to optical devices having an ordered colloidal suspension in an optically active medium for determining the optical properties of the device.

BACKGROUND OF THE INVENTION

A large number of optical devices rely on amorphous material such as glass or on crystalline materials or on structures comprised of intervening layers of crystalline or amorphous materials for providing desired optical characteristics. Some optical devices utilize a coherent Bragg scattering characteristic of a periodic layered structure to achieve a desired optical property. For example, devices such as semiconductor distributed feedback (DFB) lasers and Bragg optical filters rely on such properties.

A particular problem associated with such optical devices is the required construction of a layered optical device having very small inter-layer dimensions, the dimensions being on the order of half that of the wavelength of the radiation of interest. For example, it has been known to utilize molecular beam epitaxy (MBE) and organometalic chemical vapor deposition (OCVD) techniques to form DFB semiconductor lasers which are comprised of a plurality of thin layers of semiconductor material. As can be appreciated, in any such device the fabrication process is an important and costly consideration. For example, any variations in layer thicknesses or in surface roughness between the layers may cause undesirable optical effects to occur. Additionally, another problem associated with such devices is that the lower limits of currently available semiconductor layer formation techniques, and also photolithography, may not be suitable for providing a device having the desired thickness and spacing of Bragg reflective layers. Thus, a lower limit is approached on the wavelengths of radiation which may be employed with these devices.

Another problem associated with prior optical devices relates specifically to nonlinear optical devices such as birefringent and polarization sensitive devices. The hyperpolarizability of conventional devices may not be optimum for some applications. Furthermore, these conventional devices may be fragile, costly and have a response limited to a narrow range of wavelengths.

One further problem associated with prior optical devices relates to those types of devices which comprise a dipolar dye having a desired radiation absorption and emission characteristic. In some conventional devices it may be necessary to provide an external electrical field to orient the dye molecules in a desired configuration. It has been known to utilize a crystalline colloidal structure having a plurality of parallel, spaced apart planes as a passive Bragg diffracting filtering device for separating a narrow wavelength band from a broader spectrum of electromagnetic radiation, as is shown in U.S. Pat. Nos. 4,627,689 and 4,632,517 to S. A. Asher.

SUMMARY OF THE INVENTION

The foregoing problems are overcome and other advantages are realized by an optical device comprising a crystalline colloidal suspension having a lattice structure comprised of parallel planes of ordered, electrically charged spheres suspended in an optically active medium, adjacent ones of the planes having a substantially uniform spacing therebetween. The optically active medium may be a liquid or solution such as $H_2O$, $CH_3OH$ and $CS_2$. The medium may also have a dye dissolved in the liquid or solution. In accordance with the invention, the optically active medium is selected to have a characteristic range of radiation absorption, emission or nonlinear polarization properties at a wavelength, in the medium, equal to twice the spacing between the planes.

In a first embodiment of the invention there is disclosed a sheared or an unsheared colloidal crystalline suspension which functions as a birefringent crystal at optical wavelengths. Moreover, the addition of a radiation absorbing dye, preferably a polar dye, to the solution results in a bulk noncentrosymmetric orientation of the dye. Optical devices, such as birefringent devices for second harmonic generation and polarization dependent absorption of an incident radiation beam are thereby realized.

In another embodiment of the invention a DFB laser has an active gain region which is comprised of a plurality of ordered colloidal suspension Bragg planes. The medium has a dye solution added thereto, the particular dye solution being selected for the desired wavelength of operation. The DFB laser having the dye solution is pumped with a source of optical energy, the Bragg reflectors created by the aligned planes providing a distributed feedback through the gain medium and a lasing action which occurs at a wavelength near the Bragg wavelength in the emission spectrum of the selected dye.

In another embodiment of the invention there is disclosed a dye laser comprised of a layer of a desired dye which is flowed in a parallel, adjacent manner to the planes of a colloidal suspension Bragg reflector. A pump beam of radiation which impinges upon a surface of the dye layer is selectively absorbed within the layer and readmitted as a coherent beam having a desired wavelength, the wavelength being related to the emission properties of the selected dye. The thin layer of colloidal suspension forms a wavelength selective end reflector for the laser, the Bragg wavelength of the colloidal suspension selecting the output wavelength of the dye laser.

In another embodiment of the invention there is disclosed an injection locked laser which comprises a laser gain medium, such as laser rod comprised of Alexandrite, and an output coupling mirror. The laser has a colloidal suspension DFB laser disposed at one end to function as both an end reflector and as an injection locking source. Both the rod and the DFB laser are simultaneously pumped by a source of pump radiation, such as a flashlamp. The DFB laser emits radiation at a characteristic wavelength related to both the spacing between adjacent planes and to the fluorescence spectra of a dye solute, the spectra being selected to be inside the gain bandwidth of the rod material (Alexandrite having a gain bandwidth of approximately 7000-8000 Angstroms). The emitted radiation is injected into the rod and locks the emission wavelength of the rod to that of the DFB laser. Radiation of the characteristics wavelength which is emitted from the rod back toward the DFB laser encounters a highly wavelength selective Bragg end reflector, due to the spacing between the planes of the colloidal suspension. Other wavelengths are not strongly reflected back into the rod and are thus attenuated.

In another embodiment of the invention an ordered colloidal suspension having an optically active medium is disclosed for generating a continuous wave (cw) modulated radiation beam from a non-modulated radiation beam. The cw modulation is shown to result from an instability resulting from a radiation propagation time and the relaxation time of the index of refraction of the colloidal suspension medium. Incident radiation to be modulated has an intensity (I) which is selected to be greater than a critical intensity ($I_c$) related to the Bragg reflection and transmission characteristics of the crystal and the nonlinear index of the medium.

In another embodiment of the invention there is disclosed an ultra-fast optical switch which is comprised of an ordered colloidal crystalline suspension having an optically active medium, the medium and colloidal crystalline structure having reflection and transmittance properties which are related to the Bragg spacing between the ordered planes. The switch is responsive to the intensity (I) of incident radiation for being switched between an on, or transmitting, and an off, or reflecting, state.

Also, there is shown a radiation admitting window which is comprised of an ordered colloidal suspension. The suspension is normally transmitting to incident radiation. However, an incident radiation beam above a given intensity impinging on the window induces a heating of the crystalline structure. This heating causes a rapid melting and disordering of the macrocrystalline structure resulting in the suspension becoming highly opaque, thereby reflecting the incident radiation. Such a window is shown to be useful for protecting a radiation detector from a radiation beam having an intensity above a predetermined threshold.

BRIEF DESCRIPTION OF THE DRAWINGS

These and other features of the invention will be described in detail hereinafter in reference to the drawings, wherein:

FIG. 6 is a graph showing the linear radiation transmission characteristic of two colloidal suspensions of differing concentrations;

DETAILED DESCRIPTION OF THE INVENTION

Figure 1A:
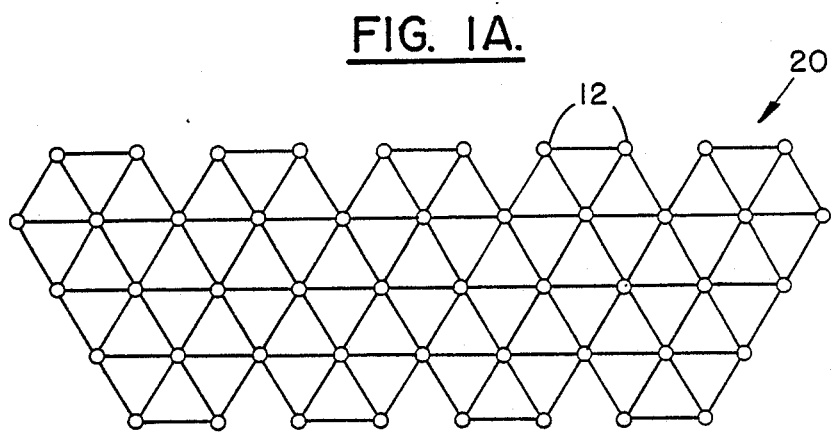
FIG. 1a shows a plane of a typical crystalline colloidal suspension having a triagonal structure FCC (111 plane) or hexagonal packing.

Referring first to FIG. 1, and in particular to FIG. 1a there is shown a crystalline plane 10 comprised of a plurality of microspheres arranged in a crystal group having a hexagonal pattern. Each of the microspheres 12 is typically comprised of a polystyrene latex material having a diameter of approximately 0.1 microns. In addition, microspheres made of nonlinear materials such as CdS or CdSe may be used. The microspheres 12 are suspended in an optically active medium, such as ultra-pure deionized $H_2O$ or some other solvent such as $CH_3OH$, with the possible addition of a solute such as a dye. Each of the microspheres 12 typically has a plurality of $SO_4$-groups attached to the surface thereof, resulting in each of the microspheres 12 carrying a surface charge of approximately $10^3$ electrons. The microspheres may also have carboxyl or amidine groups attached to the surface. The approximately uniform surface charge of each of the microspheres 12 results in the spheres interacting one with the other via a repulsive screened Coulomb potential. When the density of ions within the medium is low, the Coulomb potential as a function of radial distance (r) is approximately given by $$U(R) = A \frac{e^{-\kappa(r - r_b)}}{r(1 + \kappa r_b)} \tag{1}$$

where $r_b$ is the radius of the sphere and $\kappa$ is the Debye screening length determined by the ionic strength of the solution. At a pH of 7, the value of $\kappa$ is approximately $3 \times 10^6 m^{-1}$.

Inasmuch as deionized $H_2O$ has an electrical resistance of approximately 18 Mohms per centimeter the Coulomb potential between the microspheres 12 results in a regular ordering of the microspheres such as the hexagonal arrangement as shown in FIG. 1a.

Figure 1B:
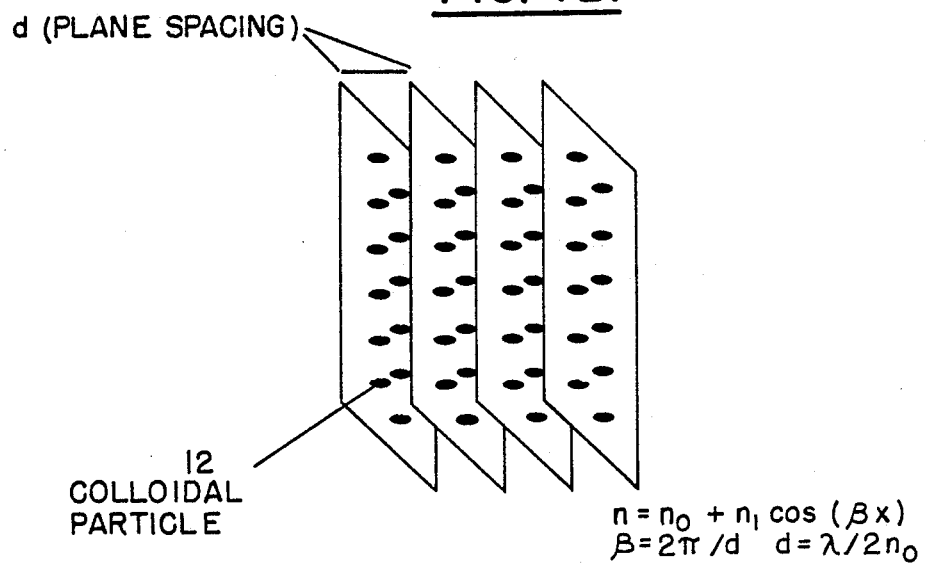
FIG. 1b shows the spacing between planes of a typical colloidal suspension and a mathematical model for the structure describing the index modulation.

In general, colloidal suspensions having from $10^{13}$ to $10^{15}$ microspheres/$cm^3$ may assume FCC, BCC, or HCP lattice structures having lattice constants comparable in magnitude to optical wavelengths. The mechanical properties of such a colloidal "macrocrystal" are functions of microsphere density and screening counter-ion concentration within the medium. The spacing between adjacent hexagonal or trigonal planes is shown in FIG. 1b wherein it can be seen that the spacing between adjacent planes has a characteristic uniform dimension of d. FIG. 1b also illustrates that the index of refraction (n) of the suspension is related to the spacing d in accordance with the equation $$n = n_0 + n_1 \cos(\beta X) \qquad (2)$$

where
$\beta = 2\pi/d$
$n_0$ is the index of the medium
$n_1$ is the index due to the micropheres and
$d = \lambda/2n_0$.

Bulk suspensions of such microspheres 12 are poly-crystalline having single-crystal domain areas as large as 1 mm$^2$ and are thermally stable to the boiling point of the medium, or 100° C. if the medium is H$_2$O. Longitudinal acoustic waves are heavily damped by the medium resulting in negligible thermal fluctuations in lattice parameters or in the optical properties of the polycrystalline bulk suspension. The high frequency cutoff of longitudinal waves is approximately 10$^5$ Hz.

The ordering of the microspheres 12, due to the repulsive Coulomb potential therebetween, results in optical resonance enhancement of desired wavelengths of radiation. As can be appreciated, if the distance d is one half of the wavelength of an incident beam of radiation, or $\lambda/2$, the resulting crystalline material exhibits Bragg reflective properties to the incident radiation, as disclosed in U.S. Pat. Nos. 4,627,689 and 4,632,517.

In summary, the typical characteristics of such monodisperse polystyrene-H$_2$O ordered suspensions are as follows. The microsphere particle size may range from 0.089 to 0.300 microns, each of the particles having a charge of between 200 to 3000 electrons. The index of refraction of a polystyrene latex microsphere is approximately 1.59. The resultant lattice spacing between ordered planes is approximately 1,000 to 10,000 angstroms. The elastic compliance of the solution is approximately 1–50 dynes/cm$^2$, the particular value being a function of the ionic strength of the suspension. The melting temperature of a relatively low density ($\approx 10^{11}/\text{cm}^3$) polycrystalline structure is typically in the range of 25°–30° C. The index of refraction of the microspheres may or may not be closely matched to that of the medium. For some applications it may be desirable to select a medium which has a significanty different index of refraction than that of the microspheres in order to achieve strong Bragg reflection from short crystalline lengths. In other applications, involving nonlinear media, the index of refraction of the liquid media may be chosen to be close to that of a microsphere. For example, sucrose solutions (approximately 60% sucrose) may be used to index match the spheres' index of refraction.

Inasmuch as a dye solution, preferably a dipolar dye species, may also be added to the suspension or otherwise used in conjunction therewith, the polycrystalline structure resulting from such an ordered colloidal suspension may be advantageously employed to construct a number of useful optical devices. Based upon the foregoing general description several of these optical devices will hereinafter be described.

A. NONCENTROSYMMETRIC AND BIREFRINGENT MATERIALS FOR NONLINEAR OPTICAL RESPONSE AND POLARIZATION SENSITIVE TRANSMISSION

The generation of a noncentrosymmetric electric field potential is advantageous in the construction of nonlinear optical devices, such as frequency doublers. Conventional frequency doublers, such as potassium dihydrogen phosphate (KDP) crystals convert a relatively large proportion of an incident radiation beam into the beam's second harmonic, thereby doubling the frequency and halving the wavelength of the radiation. However, such crystals are relatively expensive, are mechanically fragile and are limited to certain ranges of wavelength.

In addition, KDP has a hyperpolarizability, or nonlinear susceptibility, of approximately $10^{-9}$ e.s.u.. LiNO$_3$, another conventional nonlinear crystalline material, has a susceptibility of approximately $10^{-8}$ e.s.u. while GaAs has a characteristic figure of $10^{-7}$ e.s.u.. Some dyes, however, such as merocyanine, have a much more favorable nonlinear susceptibility of approximately $10^{-5}$ e.s.u. However, in solution the random orientation of merocyanine severely restricts its use as a nonlinear optical material. It has been found, however, that merocyanine molecules in solution with a sheared, ordered colloidal suspension are ordered by the microsphere crystalline structure.

It should be pointed out that in a nonlinear optical device the colloidal crystalline structure is preferably a hexagonal or FCC structure. Furthermore, as opposed to mechanically shearing the crystal, centrosymmetry may also be broken by making alloys, such as crystals with two different size microspheres, e.g., 0.121 microns and 0.09 microns. These alloyed FCC structures resemble ionic crystals such as NaCl.

The addition of Mercyanine to such a colloidal suspension has been found to not adversely affect the crystallization of the suspension, even with a $10^{-3}$ M solution of merocyanine.

In accordance with the invention such noncentrosymmetric materials may be "tailor made" by adjusting parameters associated with the colloidal suspension, such as the concentration, and also the type and concentration of the dye molecules added thereto. Inasmuch as most dye molecules are dipolar species, the dye molecules will align with the intrinsic microsphere electrical potential to yield a macroscopic nonlinear polarizing structure having no inversion symmetry. Such a colloidal crystal-dye nonlinear optical device is inherently less expensive and more rugged than conventional crystalline nonlinear devices and may have conversion efficiencies far exceeding those of conventional nonlinear optical materials. Furthermore, since sheared crystals are typically naturally birefringent, index of refraction matching conditions may be satisfied by appropriate angular orientation of an incident radiation beam.

In accordance with one embodiment of the invention it has been found that sheared thin colloidal crystals exhibit strong polarization dependent scattering and transmission properties and that dipolar molecular species dissolved in an aqueous suspension of microspheres are highly oriented along the shearing direction.

Anisotopic optical devices may also be birefringent materials which have differing indices of refraction depending upon the direction of polarization of an incident radiation beam. Both ruby (Al$_2$O$_3$Cr++) and sapphire (Al$_2$O$_3$) crystals are examples of conventional birefringent materials with and without absorption, respectively; the sapphire being analogous to a sheared colloidal suspension and the ruby, due to the absorption by Cr, being analogous to a sheared colloidal suspension having an absorbing dye in solution therewith.

EXAMPLE

Figure 7:
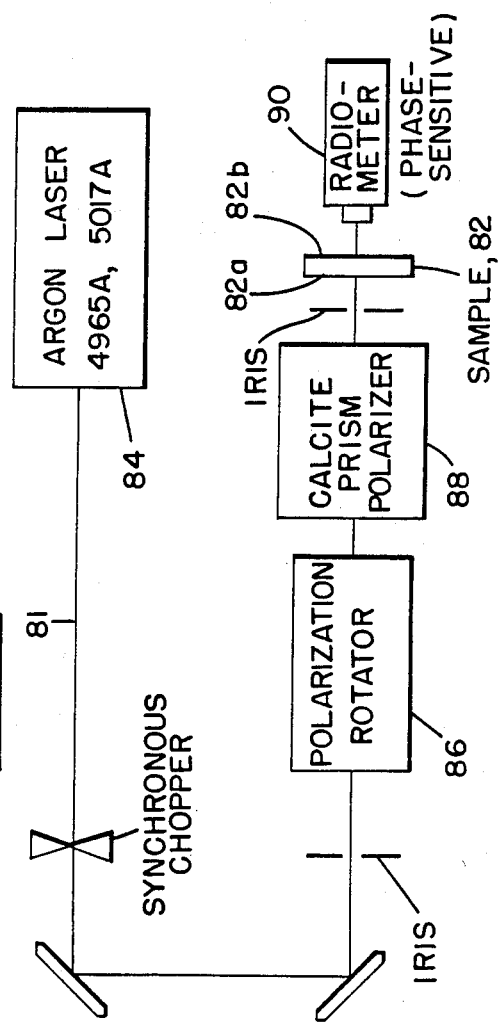
FIG. 7 shows in block diagram form apparatus operable for deriving the graphs of FIGS. 4a, 4b and 4c.

The apparatus 80 shown in block diagram form in FIG. 7 was utilized to measure the power of a laser beam 81, transmitted through the thinnest dimension of a sample cell 82, as a function of the laser beam polarization angle. The angle of polarization of the laser beam was rotated with a Soleil-Babinet polarization compensator 86. Linear polarization and polarization angle were confirmed by sending the incident beam through an orientable calcite prism polarizer 88 preceding the sample cell 82. Samples within cell 82 were oriented for normal beam incidence in order to eliminate polarization dependent reflection from the glass sample cell walls 82a and 82b.

The incident laser power was maintained at approximately 10 mW in order to avoid dye degradation and was kept relatively constant by feedback circuitry (not shown) within an argon ion laser 84. Transmitted powers were measured with a radiometer 90, and are plotted in FIGS. 4a, 4b and 4c as percent deviation from the average value over all measured angles.

Sheared colloidal crystals were prepared from an aqueous colloidal suspension of 0.121 micron diameter sulfated polystyrene latex spheres which had been washed in a mixed bed ion exchange resin. The suspension was injected into a 100 $\mu$m thick demountable cuvette and allowed to crystallize with a shear along the long direction of the cell. The shear rates were found to be in the range of 1–3 cm/sec and resulted in 1 cm $\times$ 3 cm $\times$ 0.01 cm single crystals.

Measurements were performed on colloidal crystals having a particle density of $1.03 \times 10^{14}$ spheres/cm$^3$ which were in a hexagonal lattice oriented with the c-axis parallel to the normal of the cuvette faces. The crystal structure of the samples was confirmed by light scattering experiments using a tunable rhodamine 6G ring dye laser. Laue diffraction photographs of a sheared colloidal crystal taken in reflection demonstrated a distorted hexagonal structure of the sample.

The spacing between planes along the axis parallel to the incident laser beam was calculated from the position of a Bragg transmission notch. The transmission as a function of wavelength for the colloidal crystal as prepared above was found to have a Bragg transmission notch at 6200 Å. The position of the notch in conjunction with the index of refraction of water (1.33) and incident beam angle ($\theta = 90°$) results in a calculated spacing between lattice planes of approximately 2200 angstroms.

Figure 4A:
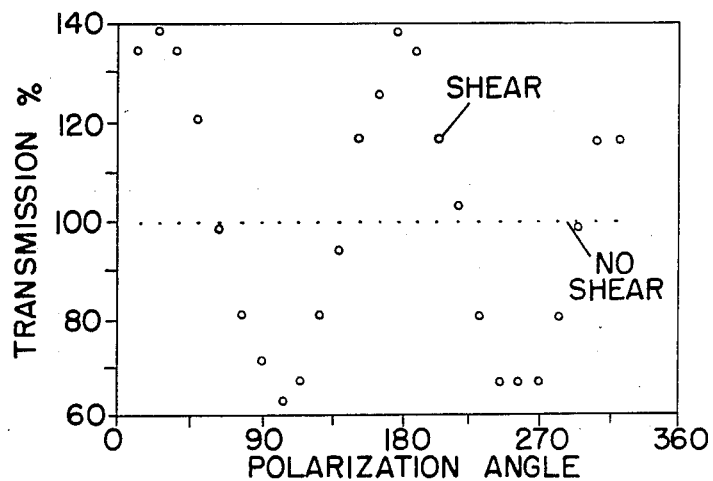
FIGS. 4a, 4b and 4c are graphs which illustrate the transmission as a function of polarization angle of a sheared and an unsheared colloidal suspension, the absorption spectra of a merocyanine/deionized water solution, and the transmission as a function of polarization angle comparing sheared colloidal suspensions with and without dye in solution therewith, respectively.

Polarization measurements on sheared and unsheared colloidal crystals containing no dye are shown in FIG. 4a. The results indicate that for no shear, the crystals are isotropic since all microspheres have the same scattering properties. The sheared crystals, however, revealed a strong birefringence, the highest transmission being for the polarization orientation parallel to the shear direction.

Figure 4B:
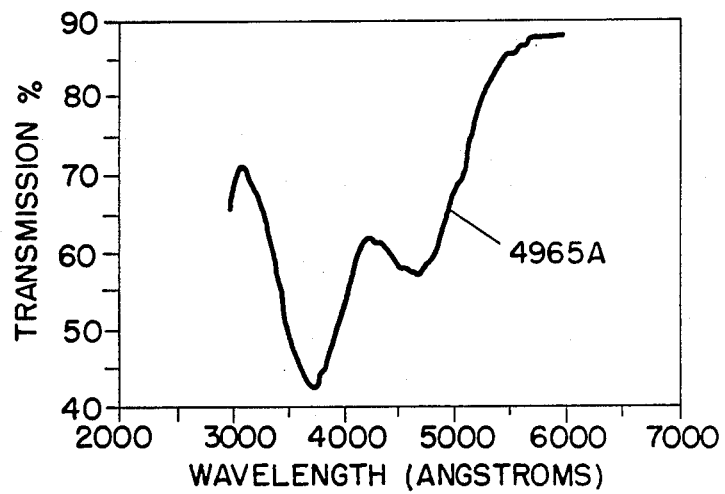

Further polarization measurements performed with colloidal crystals in $10^{-3}$ molar aqueous solution of trans-merocyanine dye are illustrated in FIG. 4b. Merocyanine is a donor-acceptor molecule which has been found to exhibit an exceptionally large hyperpolarizability and absorption in the 3000–6500 angstroms wavelength region. FIG. 4b shows the absorption spectrum of the merocyanine solution in deionized water.

Figure 4C:
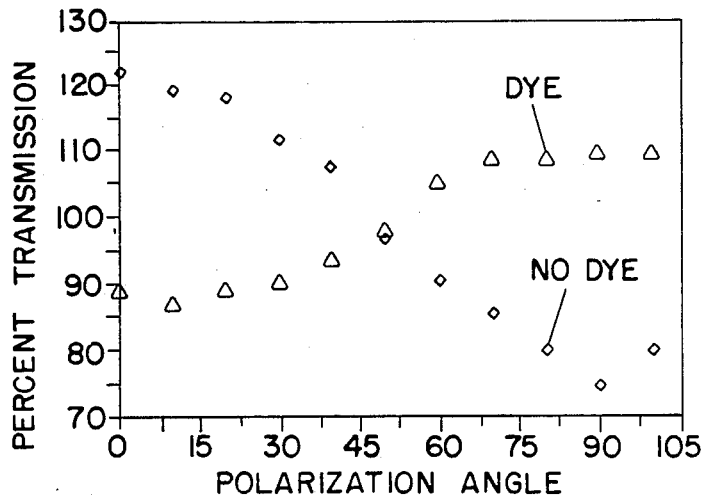

The trans-configuration of merocyanine in conjunction with the known destabilized resonance structures at the two ends of the molecule leads to an anisotropy in $\pi$-electron mobility and strong coupling of radiation along the molecular axis. This results in the macroscopic absorption and nonlinear response of an oriented sample of merocyanine exhibiting strong polarization selectivity. FIG. 4c shows the transmission of various samples as a function of the polarization angle relative to the shearing axis. The graph of FIG. 4c shows that the peak transmission for the samples containing merocyanine dye are 90° out of phase with the pure colloidal crystal indicating strong dye absorption for the polarization parallel to the shear axis.

As can be appreciated, the effect of orienting molecules with such a molecular anisotropy in a macroscopic bulk phase may be especially advantageous in the construction of the aforementioned nonlinear optical devices. The molecular hyperpolarizability of many organic polymeric and nonpolymeric species, such as merocyanine and hemicyanine, is on the order of $10^4$ times of that of commonly used nonlinear crystals such as KDP. Previously, second harmonic generation by these dye molecules could only be generated by an external electrical field induced second harmonic generation. The external electrical field was required to generate a macroscopic non-centrosymmetric orientation of the dye in solution. A nonlinear optical device constructed in accordance with the invention, however, overcomes this requirement for an external electrical field to achieve a non-centrosymmetric orientation of the dye.

B. DISTRIBUTED FEEDBACK (DFB) LASER

One characteristic of a DFB laser is that optical feedback is provided without the use of mirrors positioned adjacent to ends of the lasing medium, as is done in many conventional types of lasers. The feedback is instead accomplished by a periodic modulation of the index of refraction and/or the gain of the medium at a wavelength equal to half the lasing wavelength. This coherent feedback provides for an active filtering action which results in increased mode selectivity and a relatively higher energy extraction efficiency than in conventional, mirrored lasers. Gain in such a periodic structure is achieved by successive reflections of the radiation progressively constructively interacting within the structure.

Figure 2:
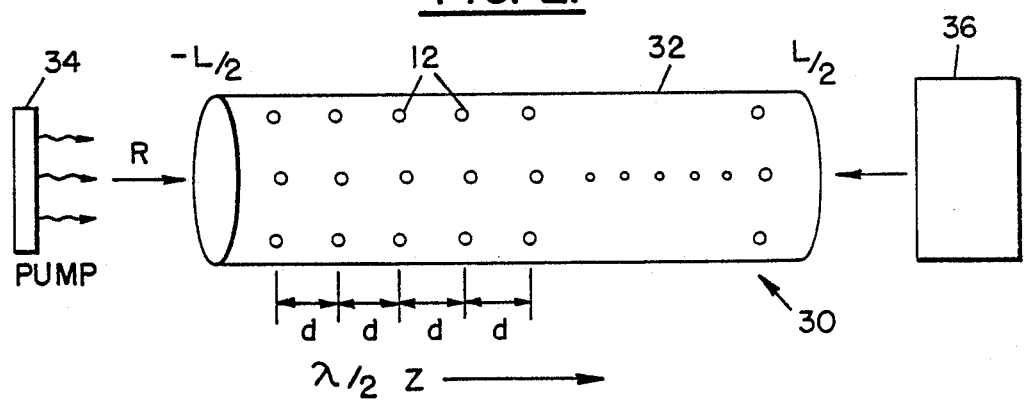
FIG. 2 shows a DFB laser having a dye/colloidal suspension active gain element.

Referring to FIG. 2 there is shown a DFB laser 30 having, in accordance with the invention, a dipolar dye containing medium comprised of an ordered colloidal suspension having a plurality of regularly spaced planes of ordered microspheres, the spacing between planes being given by the dimension d. A right traveling wave (R) and a left traveling wave (S) are shown at opposite ends of a laser cavity 32. The Z coordinate points in the direction of propagation. The coupled wave theory discussed in a journal article by H. Kogelnick and C. Shank ("Coupled-Wave Theory of Distributed Feedback Lasers", J. Appl. Phys., Vol. 43, No. 5, May 1972) and in a journal article by W. S. Rabinovich and N. M. Lawandy ("Distributed Feedback Modes in a Partially Filled Ring Cavity", IEEE Journal of Quantum electronics, Vol. QE-23, No. 2, February 1987) may be used to describe DFB properties such as the threshold gain-length products and mode properties. The coupling in the colloidal crystal DFB laser 30 is both index and gain coupling since the microspheres exclude dye molecules and thus their periodicity is mirrored in a spatial distribution of dye molecules.

Figure 2A:
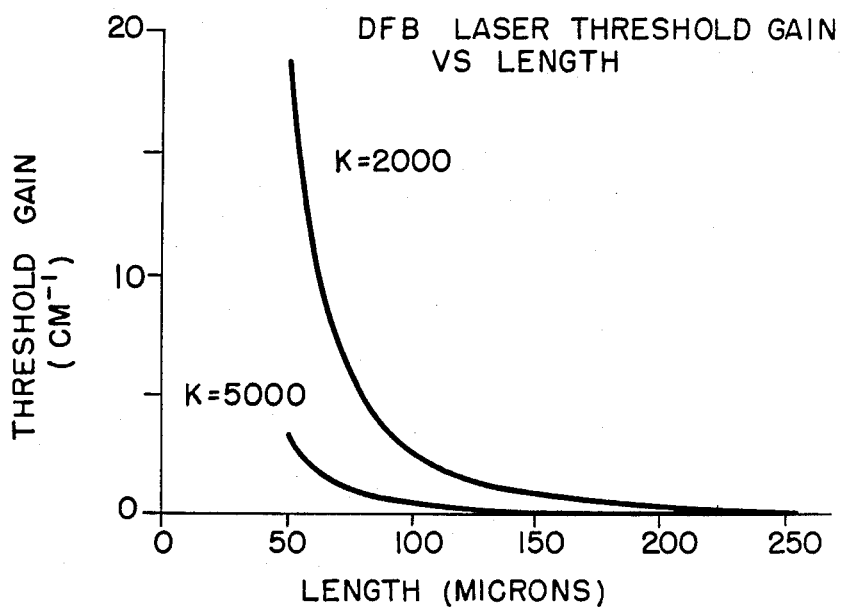
FIG. 2a is a graph showing the threshold gain versus length for the DFB laser of FIG. 2.

The numerical solution of the equations disclosed by Kogelnik and Shank (cited above) result in the determination of the total threshold mode structure of a particular embodiment of the DFB laser 30. FIG. 2a shows the threshold gain versus length for a colloidal crystal DFB laser.

Figure 3:
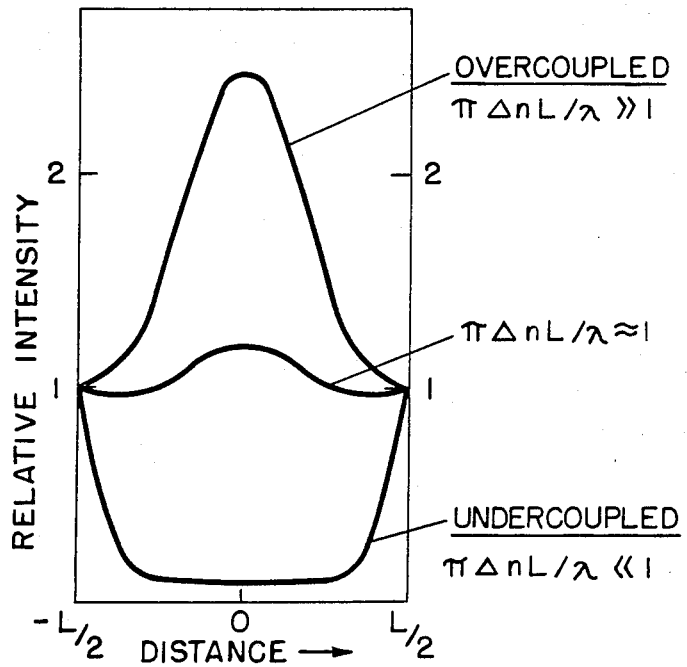
FIG. 3 is a graph showing the longitudinal electric field amplitude envelope for DFB lasers of differing length and index of refraction mismatch between the microspheres and the optically active medium.

Referring to FIG. 3 there is shown a graph illustrating the longitudinal mode envelopes for a DFB laser wherein it can be seen that for a relatively small grating most of the radiation may escape from the DFB laser structure while for a relatively large grating most of the radiation is trapped within the DFB laser structure.

EXAMPLE

A DFB laser 30 constructed in accordance with the invention may have the following characteristics. An aqueous solution of a dye, such as Rhodamine 640 (Rh 640), having a molar concentration of from $5 \times 10^{-5}$ to $5 \times 10^{-3}$ is added to the colloidal suspension within the cavity 32. The colloidal suspension may be prepared as previously described. Such a dye is typically comprised of molecules having a length of about 10 to about 50 angstroms, each of the molecules possibly having a positive or negative ion attached at one end of the molecule. Due to the negative charge of each of the microspheres some of the dye molecules are collected and aligned with the microspheres while other remain in the medium in a nonaligned condition. Some of the dye molecules are hence aligned along the planes of the crystalline colloidal suspension and thus exhibit the crystal symmetry. Rh 640 is one dye having a characteristic emission wavelength which is approximately two times that of the lattice spacing of the colloidal suspension times the index of refraction of $H_2O$ (1.33). That is, Rh 640 emits radiation at a wavelength which satisfies the Bragg resonance requirement of the colloidal suspension.

The DFB laser 30 having the Rh 640 dye added to the colloidal suspension within the optical gain element defined by cavity 32 is constructed to have a gain length product of approximately 1.5 to 2.0 and a coupling strength of approximately 2.0 to 4.0. The physical length of cavity 32 may be, for example, 1 cm. The DFB laser 30 may be pumped with a $N_2$ laser 34 having a characteristic wavelength in the ultraviolet range. The laser 30 may also be pumped with a mode locked or a Q-switched Argon or a frequency doubled Nd:YAG laser, or by a short risetime noncoherent source, such as a flashlamp, having wavelengths within the absorption band of the dye, which for Rh 640 is in a range of wavelengths centered on 514.5 nm. The $N_2$ pump 34, for example, has a pulse duration of approximately 15 nanoseconds at a pulse energy of $10^{-3}$ J. The pump source may be provided perpendicular to or parallel to the colloidal planes. The DFB laser 30 emits a coherent beam of radiation at approximately 620 nm, the emission wavelength being tuned by the lattice spacing (d) of the colloidal suspension. The laser 30 may emit radiation from each end of the cavity 32 or an end reflector, such as a mirror 36, may be disposed at one end of the cavity 32 to reflect emitted radiation back into the cavity thereby effectively doubling the length of the cavity.

C. DYE LASER WITH EXTERNAL COLLOIDAL CRYSTAL REFLECTOR

Figure 5:
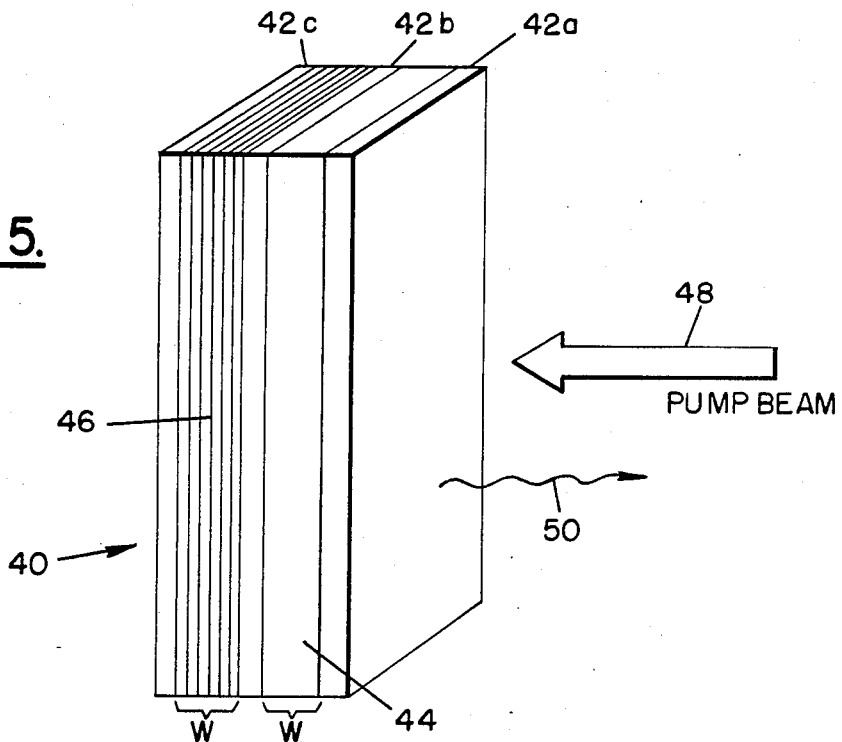
FIG. 5 shows a representative side elevational view of a dye laser having a colloidal crystal Bragg reflector.

Referring now to FIG. 5, there is shown a dye laser 40 comprised of thin transparent plates 42, such as glass plates, having a spacing W therebetween of approximately 0.01 cm. Between two of the plates 42a and 42b, which define a dye cell, is an aqueous dye solution comprised of, for example, Rh 640 or 6G. Between the central plate 42b and the rear plate 42c is a colloidal crystal Bragg reflector 46. The dye solution may be flowed between the plates 42a and 42b, as is typically done with dye lasers.

Reflector 46 can be seen to be comprised of a plurality of parallel planes or ordered microspheres, the planes being aligned normal to the incident pump radiation. Laser 40 is pumped with a pulsed pump beam 48 of radiation, the pump beam having, for example, a wave length of 503 nm and a pulse repetition rate (PRR) of 100 MHZ and a pulse width (PW) of one picosecond. The pump beam may be provided by a mode locked frequency doubled laser operating at 1060 nm or any suitable short risetime source.

The reflector 46 has a typical reflectivity of $R_1$ while the front surface of plate 42a has a typical reflectivity of approximately 4% of $R_1$.

The result of pump beam 48 being absorbed in dye layer 44, in conjunction with Bragg reflector 46, is a monochromatic laser output 50 having a narrow band laser emission wavelength of approximately 610 nm and a PRR and a PW similar to that of pump beam 48. The Bragg reflector 46, due to the spacing between planes, forms an end reflector, or mirror, which is tuned to the desired wavelength of the emitted radiation.

In accordance with the invention the reflective characteristics of the Bragg reflector 46 may be optimized for the wavelength of interest by, for example, varying the concentration of microspheres within the colloidal suspension, thereby affecting the spacing d between adjacent planes such that d is equal to one half of the wavelength of interest.

As an example and as shown in FIG. 6, a colloidal suspension having a first concentration of microspheres has a characteristic radiation transmission curve as shown by the curve labeled A. The transmissivity of the solution has a minimum and, hence, the reflectivity is at a maximum, at a wavelength of 612.5 nm. This point on the curve is related to the Bragg wavelength for the suspension and, as has been shown above, further relates to the spacing d between adjacent planes of ordered microspheres. By diluting the microsphere concentration the spacing d is increased resulting in the transmission curve labeled B, wherein it can be seen that the Bragg wavelength has been increased to 661 nm.

It can be appreciated that a large number of optical devices may be "tailor made", that is, their Bragg wavelength characteristics may be determined, by a relatively simple step of varying the microsphere concentration of the colloidal suspension.

D. INJECTION LOCKED LASER HAVING A DFB COLLOIDAL CRYSTAL END REFLECTOR/INJECTION LOCKING SOURCE

Figure 11:
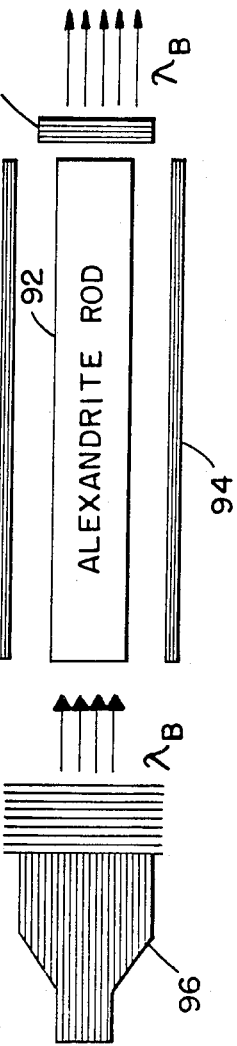
FIG. 11 is a block diagram showing an injection locked laser having a lasing rod and a wavelength selective end reflector comprised of a crystalline colloidal suspension DFB laser.

Referring now to FIG. 11 there is shown another embodiment of the invention wherein a colloidal crystal DFB dye laser 90 is disposed adjacent to one end of a lasing medium, for example a laser rod 92 comprised of Alexandrite (beryllium aluminate), the DFB laser 90 functioning as both an injection locking source and as an end reflector for the rod 92. Rod 92 is provided with a conventional optical excitation source, such as a flashlamp 94, while DFB laser 90 is also provided with an excitation source, which may be a flashlamp 96. Preferably, flashlamps 94 and 96 are both coupled to a common trigger means (not shown) whereby both flashlamps may be activated in a substantially simultaneous manner. Disposed at an end of rod 92 opposite DFB laser 90 is a conventional partially transmitting/partially reflecting output coupling mirror 98.

The resultant laser system 100 is an injection locked laser inasmuch as the relatively more powerful output beam ($\lambda_{B1}$) of rod 92 is locked to a wavelength provided by a relatively less powerful output beam ($\lambda_{B2}$) of DFB laser 90.

The Alexandrite rod 92 is operable for emitting coherent radiation within a range of wavelengths of between approximately 7000 to 8000 angstroms, such as a wavelength ($\lambda$) of 7321 angstroms. In order to injection lock rod 92 at this wavelength colloidal crystal DFB laser 90 is provided with a lattice spacing d of approximately 3660 angstroms ($\lambda/2$) and also with a dye having an emission wavelength of approximately 7321 angstroms. Dyes such as LD 700, LD 740 and DODCI are suitable for achieving this emission wavelength.

In operation, DFB laser 90 and rod 92 are both simultaneously pumped by flashlamps 96 and 94, respectively. The dye, for example LD 740, in solution with the colloidal crystal of DFB laser 90 absorbs the pump energy and emits radiation having a range of wavelengths, one of which is substantially equal to $\lambda/2 = d = \lambda_{B2}$. Radiation of this wavelength is emitted from DFB laser 90, as was described above, and is incident upon an end of rod 92. The injection of this wavelength into rod 92, in conjunction with the strong Bragg reflection of radiation having this wavelength by the colloidal planes of DFB laser 90 facing rod 92 results in the injection locking of rod 92 to the LD 740 emission wavelength the DFB laser. Radiation having wavelengths other than 7321 angstroms will not be as strongly reflected back into rod 92 by DFB laser 90 and, hence, will experience a loss and a concomitant attenuation. The output radiation beam of rod 92 thus has a wavelength ($\lambda_{B1}$) determined by DFB laser 90.

E. SELF-MODULATION OF RADIATION

Figure 8:
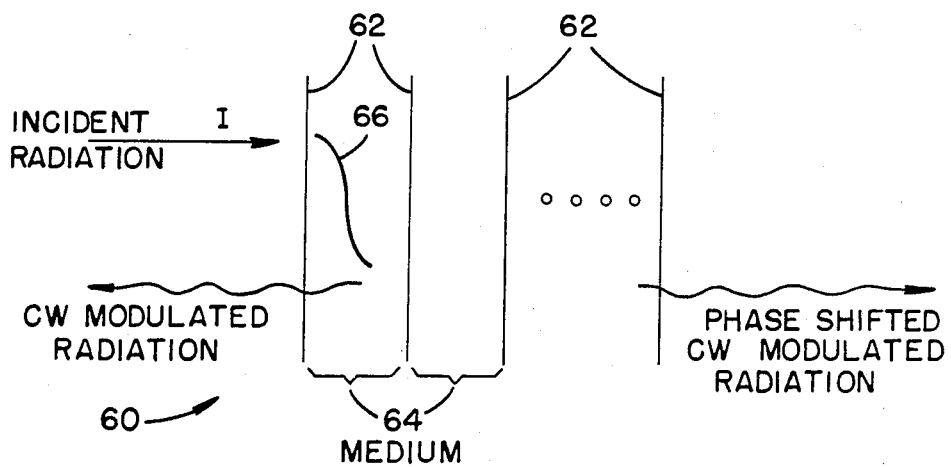
FIG. 8 shows the self modulation of incident radiation by a colloidal suspension cw frequency modulator.

The invention may also be advantageously employed to achieve the self-modulation of incident radiation. Referring to FIG. 8 there is shown a suitably contained colloidal suspension comprised of a plurality of Bragg reflective planes 62 and an optically active medium 64, such as deionized $H_2O$, carbon disulphide ($CS_2$), or molecules capable of photoisomerzation (hydrofurans). Two examples of suitable hydrofurans are HONO, which exhibits a cys to a trans transformation when irradiated, and 2-fluoroethanol, which exhibits a gauche to trans transformation when irradiated. Incident radiation of constant intensity I, which is below a critical intensity ($I_c$), induces an evanescent field wave 66 in the medium. That is, the evanescent wave 66 is not a propagating wave but is analogous to a decaying field at an interface where critical reflection occurs. This evanescent wave 66, having an intensity proportional to the input incident radiation intensity I, has the effect of causing a shift in the index of refraction of the medium, the shift in the index being therefore also related to the intensity I of the radiation field. At some critical value of I the Bragg condition is lost and the evanescent wave 66 becomes a real, propagating wave in the medium. It has been found that near the critical value of I an instability results when the medium relaxation time is comparable to the radiation transit time. This instability further results in an "oscillation" about the Bragg resonance which induces an alternate reflection and transmission through the medium. At an end of the structure opposite that of the incident radiation is also a modulated, or CW, beam having some phase shift from the input beam, the amount of phase shift being relating to the length of the structure, the propagation velocity of the radiation in the medium and other factors.

The differential equation describing the index of refraction of the suspension medium is given by $$\frac{dn}{dt}(t) = AI + (n - n_0/\tau) = 0 \tag{3}$$

This equation (3), taken in conjunction with Maxwell's equations in the slowly varying envelope limit, describes the dynamics of the reflected and transmitted fields. The net result is that the incident radiation is modulated at a frequency related to $\tau_0$, or the relaxation time of the medium, which may be approximated by $$\tau_0 \approx L/c \approx \tau \tag{4}$$

where L is the length of the structure and c is the velocity of light in the medium and $\tau$ is the relaxation time of the medium. A typical value of $\tau_0$ is one picosecond for the medium comprised of carbon disulfied ($CS_2$). The aforementioned photoisomerizing molecules typically have a relaxation rate governed by temperature. These molecules have room temperature values of $\tau_0$ of approximately 50 nanoseconds to one picosecond. In general, photoisomerizing molecules may be pumped at overtones in the one micron region or directly pumped.

F. ULTRA FAST OPTICAL SWITCHES

As has been stated, for values of I above the critical value the evanescent field wave 66 disappears and the wave becomes a real, propagating field in the medium. In this case the index of refraction is given by $$n = n_0 + aI \tag{5}$$

and the Bragg wavelength by $$\lambda = \lambda_0/(n_0 + aI). \tag{6}$$

Figure 9:
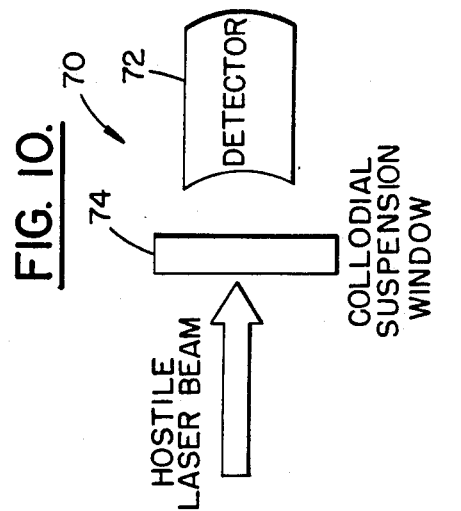
FIG. 9 shows a typical switching waveform of a colloidal suspension optical switch.

Inasmuch as the reflection properties of a Bragg structure depend in part upon the wavelength of the incident radiation being equal to twice the spacing between planes, or $$\lambda = 2d, \tag{7}$$

when $I > I_c, \lambda \neq 2d$ the Bragg structure becomes transmitting. It can be seen in FIG. 9 that a bistable optical switching element is realized wherein for values of I below the critical value the structure is reflecting while for values of I above the critical value the structure is transmitting. The switching hysteresis is due to the fact that once the switch has occurred there exists a propagating solution through the structure as opposed to the evanescent solution which only penetrates a few layers of the colloidal structure. Such an optical switch has an extremely rapid risetime approximately equal to the medium response time, which for $CS_2$ is approximately $10^{-14}$ seconds.

Thus, a cell containing a colloidal suspension prepared as described above and interposed within a beam of radiation may be advantageously utilized to switch the beam, the switching threshold being a function of the intensity of the radiation beam. For values of beam intensity below a given threshold the switch is in an off state and for values above the given threshold the switch is in an on state. Radiation switches constructed in accordance with the invention may thus be utilized in a number of applications, such as communication and data storage and processing systems, which employ radiation which is required to be switched in a rapid manner between two states.

G. PROTECTION OF SENSITIVE RADIATION DETECTORS

Figure 10:
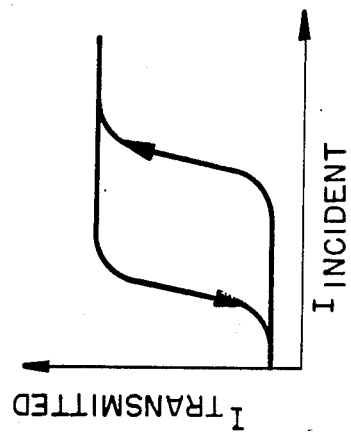
FIG. 10 is a block diagram showing a colloidal suspension protective window for a radiation detector.

Referring to FIG. 10, there is shown yet another embodiment of the invention wherein it can be seen that a radiation detecting system 70 is comprised of a radiation detector 72 which views through a window 74, the window being comprised of an ordered colloidal suspension. As can be seen by example in the curve A of FIG. 11, such a suspension may have a nearly constant and relatively high transmissivity over a range of wavelengths of between 4,000 and 5,500 angstroms, it being realized that the drop in transmissibility due to Bragg reflectivity (Bragg transmission notch) occurs at longer wavelengths, not shown in FIG. 11. For example, colloidal suspensions have been produced which have the Bragg notch in the range from 5700 angstroms to 10,000 angstroms. Thus, for this particular embodiment of the invention the window 74 could remain substantially transparent up to wavelengths of 9800 angstroms or even higher. If the intensity of the radiation passing through window 74 suddenly increases, for example if a hostile laser beam impinges on the window, a localized heating of the colloidal crystal results. This localized heating further results in a rapid melting of the crystalline structure (in less than $10^{-4}$ seconds) and the generation of an unordered suspension. As can be seen in the curve B of FIG. 11, an unordered colloidal suspension has a lower transmissivity and, hence, a higher reflectivity than the ordered suspension. The higher reflectivity reflects the impinging, high intensity beam thereby protecting the detector 72 from damage. The suspension remains in this relatively opaque condition for as long as the hostile beam is present. When the beam is removed, the suspension rapidly cools and recrystallizes, thereby once more becoming transparent. The melting temperature of the crystal may be adjusted by the addition of a source of positive ions to the medium, such as salts or acids, which will tend to "weaken" the crystalline microsphere structure and lower its melting point. Thus, both the sensitivity of the window 74 and also the response time to an incident radiation beam may be adjusted. In addition, absorbing dyes having a low fluorescence efficiency may also be used as a solute to deposit heat at a faster rate than normally occurs in the colloidal suspension itself, thereby lowering the melting temperature.

It can be appreciated that in each of the embodiments of the invention disclosed above that the optically active medium is selected to have properties which modulate, in conjunction with the spacing between adjacent planes of microspheres, one or more characteristics of the incident radiation. That is, the optically active medium is selected to be responsive to the incident radiation such that the frequency, amplitude, phase and/or intensity of the incident radiation is varied. Thus, optical devices constructed in accordance with the invention advantageously employ properties of a colloidal crystalline suspension beyond the purely structural characteristics of the suspension. Opposed to such a purely structural reliance, an optical device constructed in accordance with the invention employs an optically active, as opposed to a passive, medium which is selected to achieve a desired modulation of incident radiation, such as providing gain and coherence to the radiation, amplitude modulation of the radiation, frequency doubling of the radiation, or a filtering of the radiation in accordance with the polarization angle of the radiation.

A number of embodiments of the invention have been set forth above and it is anticipated that those having skill in the art will envision modifications to these embodiments. For example, the use of the invention may be carried out by a number of different types of optically active mediums which are selected to have a characteristic range of radiation absorption, emission or nonlinear polarization properties at a wavelength equal to twice the spacing between microsphere planes. The invention may also be practiced by providing as a solute a number of different types of dyes other than those disclosed herein. Also, the medium need not be in the liquid phase. In some applications it may be desirable to solidify the medium, thereby substantially immobilizing the microsphere crystalline structure within the medium. Such an immobilization may be accomplished by using a water based polymer, such as polyacrylimide, which is added to the medium. Furthermore, the various types of optical devices described herein are not meant to be exhaustive, it being realized that a large variety of optical devices are made possible by the teaching of the invention. Hence, the invention is not meant to be limited to the embodiments disclosed herein, the invention is instead to be considered to be limited only by the scope of the appended claims.

What is claimed is:

1. An optical apparatus comprising:
   means for receiving incident electromagnetic radiation;
   means, responsive to at least one characteristic of said received radiation, for modulating said received radiation; and
   means for emitting said modulated radiation;
   wherein each of said means for receiving, said means for modulating and said means for emitting comprise:
   a crystalline colloidal suspension having a lattice structure comprised of a plurality of parallel planes of ordered, electrically charged spheres suspended in an optically active medium, adjacent ones of the planes having a substantially uniform spacing therebetween; and wherein
   said optically active medium comprises molecules selected to have a predetermined index of refraction, radiation absorption, radiation emission or a nonlinear optical response property at a wavelength substantially equal to twice the spacing between said planes.

2. An optical apparatus as defined in claim 1 wherein said spheres are comprised of polystyrene latex and have a diameter of between approximately 0.08 to 0.300 microns.

3. An optical apparatus as defined in claim 2 wherein each of said spheres has a surface charge of between approximately 200 to approximately 3000 electrons and wherein the spacing between said adjacent planes is between approximately 1000 to approximately 10,000 angstroms.

4. An optical apparatus as defined in claim 3 wherein said spheres have an index of refraction of approximately 1.57 at a density of about $10^{11}$ to about $10^{14}$ spheres per cubic centimeter.

5. An optical apparatus as defined in claim 4 wherein said medium further comprises:
a dye comprised of dye molecules selected to have a characteristic range of radiation absorption and emission wavelengths at least one of which is substantially equal to twice the spacing between said planes.

6. An optical apparatus as defined in claim 5 wherein a beam of electromagnetic radiation incident upon said apparatus is absorbed by said dye molecules and excites said dye molecules such that said dye molecules fluoresce, and wherein said fluorescence radiation has a predetermined wavelength within a range of wavelengths, the predetermined wavelength being substantially equal to twice the spacing between said adjacent planes such that said emitted radiation is amplified by being successively Bragg reflected by said planes whereby said reflected radiation progressively interacts constructively.

7. An optical apparatus as defined in claim 1 wherein said characteristic is a wavelength of said incident radiation.

8. An optical apparatus as defined in claim 1 wherein said characteristic is an intensity of said incident radiation.

9. An optical apparatus as defined in claim 1 wherein said characteristic is a polarization angle of said incident radiation.

10. An optical apparatus as defined in claim 1 wherein said optically active medium further comprises means for immobilizing said spheres within said medium.

11. An optical apparatus as defined in claim 10 wherein said immobilizing means comprises a polymer operable for substantially solidifying said medium, thereby immobilizing said spheres.

12. A distributed feedback laser comprising:
a cavity structure having first and second ends;
a crystalline colloidal suspension having a lattice structure comprised of parallel planes of ordered, electrically charged spheres suspended in an optically active medium, adjacent ones of the planes having a substantially uniform spacing therebetween, said suspension being contained within said cavity structure such that said planes are substantially parallel to said ends;
a dye in solution with said medium, said dye being comprised of dye molecules selected to have a range of radiation absorption and emission wavelengths at least one of which is substantially equal to twice the spacing between said planes; and
a radiation pump having an output optically coupled to said cavity structure for pumping said dye molecules with radiation such that said dye molecules absorb and emit radiation, said emitted radiation being repeatedly Bragg reflected by said planes such that said reflected radiation progressively interacts constructively for providing gain to said laser.

13. A laser as defined in claim 12 further comprising a reflector disposed adjacent to one of said first or second ends for reflecting radiation emitted by said dye molecules back into said cavity.

14. A laser as defined in claim 12 wherein said medium comprises deionized $H_2O$ and wherein said dye is comprised of Rhodamine 640.

15. A laser as defined in claim 14 wherein said Rhodamine 640 is in aqueous solution having a concentration of from $5 \times 10^{-5}$ to $5 \times 10^{-3}$M.

16. A laser as defined in claim 15 wherein said radiation pump is a radiation source having a wavelength of approximately 514 nm.

17. A laser as defined in claim 15 having a gain-length product of approximately 1.5 to approximately 2.0 and a coupling strength of approximately 2.0 to approximately 4.0.

18. A radiation modulator comprising:
a cavity having first and second ends;
a crystalline colloidal suspension having a lattice structure comprised of parallel planes of ordered, electrically charged spheres suspended in an optically active medium, adjacent ones of said planes having a substantially uniform spacing therebetween, said suspension being contained within said cavity such that said planes are substantially parallel to said ends;
a source of radiation to be modulated having a wavelength substantially equal to twice the spacing between said planes and an intensity (I) less than a critical intensity ($I_c$) for inducing an evanescent, non-propagating field potential in said medium adjacent to each of said planes, said evanescent field potential modifying a refractive index of said medium such that said radiation is periodically Bragg reflected by said planes, said periodic Bragg reflection inducing a corresponding periodic amplitude modulation of radiation emitted from said cavity.

19. A radiation modulator as defined in claim 18 wherein a frequency of said periodic amplitude modulation is related to $\tau_o$ where $$\tau_o \approx L/c$$

where L is the length of the cavity and c is the velocity of the radiation in the medium.

20. A radiation switching device comprising:
a cavity having first and second ends;
a crystalline colloidal suspension having a lattice structure comprised of parallel plane of ordered, electrically charged spheres supended in an optically active medium, adjacent ones of said planes having a substantially uniform spacing therebetween, said suspension being contained within said cavity such that said planes are substantially parallel to said ends;
an incident radiation beam having a wavelength substantially equal to twice the spacing between said planes and an intensity (I) which is less than or greater than a critical intensity ($I_c$) such that when $I > I_c$ there is induced a propagating field potential in said medium, said propagating field potential modifying a refractive index (n) of said medium in accordance with the equation $$n = n_o + aI,$$

said propagating field potential also modifying a Bragg wavelength associated with the spacing (d) between said planes in accordance with the equation $$\lambda = \lambda_o/(n_o + aI).$$

21. A radiation switching device as defined in claim 20 wherein for a value of I given by $$I > I_c, \lambda \neq 2d$$

said radiation propagates through said cavity and is not Bragg reflected.

22. A nonlinear optical device comprising:
a cavity having first and second ends;
a crystalline colloidal suspension having a lattice structure comprised of parallel planes of ordered, electrically charged spheres suspended in an optically active medium, adjacent ones of the planes having a substantially uniform spacing therebetween, said suspension being contained within said cavity such that said planes are substantially parallel to said ends;
a dye in solution with said medium, said dye being comprised of dye molecules selected to have a range of radiation absorption and emission wavelengths at least one of which is substantially equal to twice the spacing between said planes; and wherein:
said electrically charged spheres align said dye molecules with a periodicity corresponding to said spacing between adjacent planes such that said dye molecules are induced to have a bulk noncentrosymmetric field potential whereby the radiation absorption and emission characteristics of said dye molecules are made polarization specific to a polarization of an incident radiation having a wavelength within the range of wavelengths.

23. A nonlinear optical device as defined in claim 22 wherein an incident radiation beam having a wavelength λ passing through said cavity normal to said ends exits said cavity with a wavelength of λ/2.

24. A nonlinear optical device as defined in claim 22 wherein said device has birefringent optical characteristics.

25. A nonlinear optical device as defined in claim 22 wherein said dye is comprised of merocyanine.

26. A window for transmitting therethrough incident radiation having an intensity less than a threshold intensity comprising:
a cavity having first and second ends;
a crystalline colloidal suspension having a lattice structure comprised of parallel planes of ordered, electrically charged spheres suspended in an optically active medium, adjacent ones of the planes having a substantially uniform spacing therebetween, said suspension being contained within said cavity such that said planes are substantially parallel to said ends; and wherein
radiation above a given intensity impinging on said window induces a heating of said colloidal suspension such that said ordered crystalline structure is thermally disassociated into an unordered structure, said unordered structure being substantially opaque to said radiation.

27. A window as defined in claim 26 wherein said incident radiation has wavelengths shorter than a Bragg reflection wavelength defined by said spacing between said planes.

28. A window as defined in claim 27 wherein said unordered suspension cools and recrystallizes when the intensity of said incident radiation falls below said threshold intensity.

29. A window as defined in claim 28 wherein said threshold intensity is related to the spacing between said planes and wherein a value of said threshold intensity is determined at least by a concentration of positive ions in said medium.

30. A window as defined in claim 29 wherein said positive ions are a salt or an acid intermixed with said medium.

31. A injection locked laser comprising:
a first resonant cavity structure having first and second ends and comprising a laser gain medium disposed between said ends, said laser gain medium being operable for providing gain to radiation within a predetermined range of wavelengths;
a distributed feedback (DFB) laser disposed adjacent to one of said first or second ends and comprising:
a crystalline colloidal suspension having a lattice structure comprised of parallel planes of ordered, electrically charged spheres suspended in an optically active medium, adjacent ones of the planes having a substantially uniform spacing therebetween, said suspension being contained within a second resonant cavity structure, said second resonant cavity structure being in optical alignment with said first resonant cavity structure;
a dye in solution with said medium, said dye being comprised of dye molecules selected to have a range of radiation absorption and emission wavelengths at leaast one of which is substantially equal to twice the spacing between said planes and is also within said predetermined range of wavelengths; and radiation pump means having an output optically coupled to each of said first and second resonant cavity structures for pumping both said dye molecules and said laser gain medium with radiation such that said dye molecules absorb and emit radiation, said emitted radiation being incident upon said end of said laser gain medium for injection locking said laser gain medium to said DFB laser emitted radiation.

32. A laser as defined in claim 31 and further comprising an end reflector means disposed adjacent to one of said first or second ends for reflecting radiation emitted by said laser gain medium back into said first resonant cavity structure, and wherein said end reflector means comprises said DFB laser.

33. A laser as defined in claim 32 wherein said laser gain medium is a laser rod comprised of Alexandrite.

34. A laser as defined in claim 33 wherein said optically active medium comprises dipolar dye molecules.

35. A dye laser comprising:
a transparent dye cell structure having first and second spaced apart substantially parallel faces for containing a dye therebetween;
a crystalline colloidal suspension having a lattice structure comprised of parallel planes of ordered, electrically charged spheres suspended in an optically active medium, adjacent ones of the planes having a substantially uniform spacing therebetween, said suspension being disposed adjacent to said parallel faces such that said planes are substantially parallel to said faces;
said dye being comprised of dye molecules selected to have a range of radiation absorption and emission wavelengths at least one of which is substantially equal to twice said spacing between said planes; and
a radiation pump having an output optically coupled to said dye cell structure for pumping said dye molecules with radiation such that a portion of said radiation emitted by said dye molecules impinges on said colloidal suspension, said impinging radiation having a wavelength substantially equal to said spacing for being Bragg reflected by said planes back through said dye cell structure.

36. A laser as defined in claim 35 wherein said spaced apart parallel faces are separated one from the other by approximately 0.01 cm.

37. A laser as defined in claim 36 wherein said dye molecules are selected from a dipolar dye species.

38. A laser as defined in claim 37 wherein said radiation pump pumps said dye with radiation having a wavelength of approximately 503 nm at a pulse repetition rate of 100 MHz and a pulse width of 1 picosecond.

39. A nonlinear optical device comprising:
a cavity having first and second ends, said cavity being substantially transparent to radiation having wavelengths within a range of predetermined wavelengths; and
a noncentrosymmetric crystalline colloidal suspension having a lattice structure comprised of parallel planes or ordered, electrically charged spheres suspended in an optically active medium, adjacent ones of the planes having a substantially uniform spacing therebetween, said suspension being contained within said cavity such that said planes are substantially parallel to said ends.

40. A nonlinear optical device as defined in claim 39 wherein said noncentrosymmetric crystalline colloidal suspension is a sheared crystal.

41. A nonlinear optical device as defined in claim 40 wherein said device has birefringent optical characteristics having a greatest radiation transmission for radiation having a polarization orientation substantially parallel to a direction of the shear.

42. A nonlinear optical device as defined in claim 39 wherein said noncentrosymmetric crystalline colloidal suspension comprises first spheres having a first diameter and second spheres having a second diameter.

43. A nonlinear optical device as defined in claim 39 and further comprising:
a dye in solution with said medium, said dye being comprised of dye molecules selected to have a range of radiation absorption and emission wavelengths at least one of which is substantially equal to twice the spacing between said planes; and wherein
said electrically charged spheres align said dye molecules with a periodicity corresponding to said spacing between adjacent planes such that said dye molecules are induced to have a bulk noncentrosymmetric field potential whereby the radiation absorption and emission characteristics of said dye molecules are made polarization specific to a polarization of an incident radiation having a wavelength within the range of wavelengths.

44. A nonlinear optical device as defined in claim 43 wherein said dye is comprised of merocyanine.

45. An optical gain element for a distributed feedback laser comprising:
a cavity structure having first and second ends;
a crystalline colloidal suspension having a lattice structure comprised of parallel planes of ordered, electrically charged spheres suspended in an optically active medium, adjacent ones of the planes having a substantially uniform spacing therebetween, said suspension being contained within said cavity structure such that said planes are substantially parallel to said ends; and
a dye in solution with said medium, said dye being comprised of dye molecules selected to have a range of radiation absorption and emission wavelengths at least one of which is substantially equal to twice the spacing between said planes.

46. An optical gain element as defined in claim 45 wherein said medium comprises deionized $H_2O$ and wherein said dye is comprised of Rhodamine 640.

47. An optical gain element laser as defined in claim 46 wherein said Rhodamine 640 is in aqueous solution having a concentration of from $5 \times 10^{-5}$ to $5 \times 10^{-3}$ M.

48. An optical gain element as defined in claim 45 having a gain-length product of approximately 1.5 to approximately 2.0 and a coupling strength of approximately 2.0 to approximately 4.0.

* * * * *